United States Patent
Deshpande

(10) Patent No.: US 9,888,810 B2
(45) Date of Patent: Feb. 13, 2018

(54) TOASTER

(71) Applicant: Bipin Prabhakar Deshpande, Maharashtra (IN)

(72) Inventor: Bipin Prabhakar Deshpande, Maharashtra (IN)

(*) Notice: Subject to any disclaimer, the term of this patent is extended or adjusted under 35 U.S.C. 154(b) by 17 days.

(21) Appl. No.: 14/378,100

(22) PCT Filed: Aug. 13, 2013

(86) PCT No.: PCT/IN2013/000496
§ 371 (c)(1),
(2) Date: Aug. 12, 2014

(87) PCT Pub. No.: WO2014/033752
PCT Pub. Date: Mar. 6, 2014

(65) Prior Publication Data
US 2015/0289720 A1    Oct. 15, 2015

(30) Foreign Application Priority Data
Aug. 13, 2012  (IN) .................. 2353/MUM/2012

(51) Int. Cl.
A47J 37/08    (2006.01)
(52) U.S. Cl.
CPC ................ *A47J 37/0871* (2013.01)

(58) Field of Classification Search
CPC .................................................. A47J 37/0807
See application file for complete search history.

(56) References Cited

U.S. PATENT DOCUMENTS

| | | | | |
|---|---|---|---|---|
| 1,876,901 A | * | 9/1932 | Forbes ............. | A47J 37/08 99/391 |
| 2,147,457 A | * | 2/1939 | Rahr ............... | A47J 37/08 99/391 |
| 4,372,485 A | * | 2/1983 | McCabe ........... | F23L 13/02 126/285 R |
| 4,434,781 A | * | 3/1984 | Koziol ............. | A47J 37/0713 126/25 R |
| 2004/0226550 A1 | * | 11/2004 | Hutton ............ | A23B 4/052 126/25 R |

FOREIGN PATENT DOCUMENTS

| | | | | |
|---|---|---|---|---|
| GB | 778939 A | * | 7/1957 | ...... A47J 37/0807 |
| WO | WO 2011050957 A1 | * | 5/2011 | ...... A47J 37/0835 |

* cited by examiner

*Primary Examiner* — David Angwin
*Assistant Examiner* — Spencer H Kirkwood
(74) *Attorney, Agent, or Firm* — Mark M. Friedman

(57) ABSTRACT

A toaster for evenly toasting bread products is provided. The toaster comprises at-least one heating zone inside a toasting chamber, the heating zone having at-least one baffle provided on top of at-least one heating element, the baffles trapping the hot air and reducing the rate at which hot air moves up maintaining a minimum temperature gradient along the toaster, thereby evenly toasting the bread product.

6 Claims, 4 Drawing Sheets

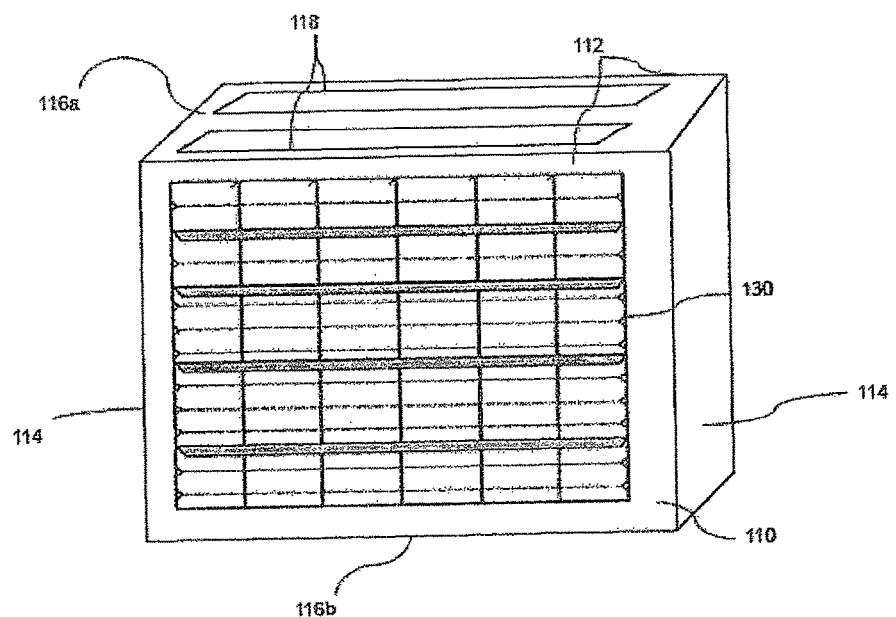
FIGURE 1A
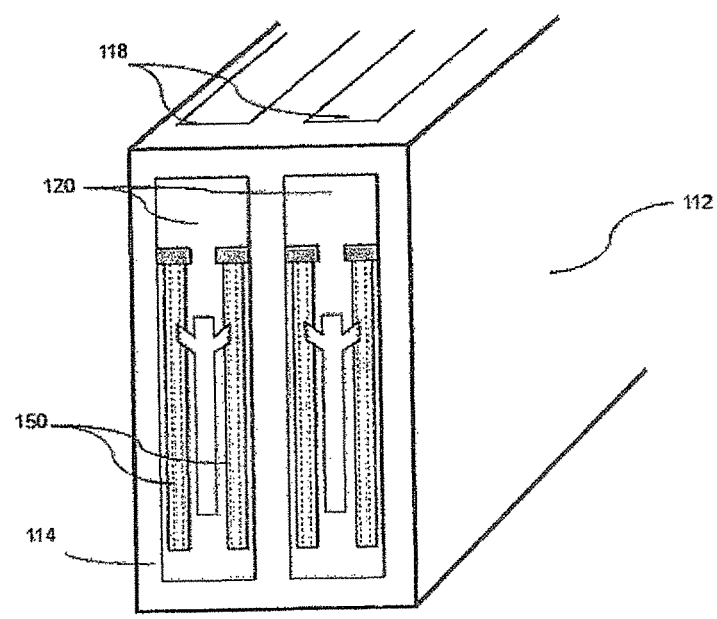
FIGURE 1B
FIGURE 1

TOASTER

FIELD OF THE INVENTION

The invention relates to a toaster, more particularly to a toaster for uniformly toasting bread products.

BACKGROUND OF THE INVENTION

Generally, a toaster comprises of a housing, toasting chambers to receive a bread product and heating elements surrounding the toasting chamber, wherein the heating elements applies radiant heat directly to the bread product to brown/toast it.

The first commercially successful toaster did not toast on both side and the bread product had to be manually flipped to toast the bread product on both sides. With advent in technology, this problem has been overcome and toasters capable of toasting bread product on both sides are available now.

Power consumption of these toasters is approximately between the range of 600 to 2000 watts depending upon type of toaster. However, in spite of the amount of energy used, the bread product is often not evenly toasted i.e. the toasted bread product near upper-half of the toaster tends to be more browned compared to lower half of the bread product. This is because the heat/hot air in the chamber moves up and out of the toaster creating maximum heat towards the top of the toaster. As the top of the toaster is generally open, the hot air escapes and more energy is consumed. Furthermore, the bread product is less toasted near its edges creating a 'U'-shaped less toasted area along edges of the bread product. This is because ambient air enters the toaster from the perforations on sides and bottom of the toaster.

The temperature difference between the upper part and lower part of the toaster could be between 75° C. to 150° C. depending on various factors like temperature and time settings, mass and temperature of the bread slice, ambient temperature of the toaster itself, etc. This temperature difference results in uneven browning/toasting of the bread slice.

To address this problem of uneven toasting toasters with a covering plate have been made available, wherein the covering plate covers the top part of the toaster. However since the covering plate covers the toaster from the top, the bread product being toasted is not visible and could obstruct the pop-up mechanism. The covering plate thus increases complexity of use of the toaster.

In view of the above there is a need for a toaster addressing at least the above mentioned problems.

SUMMARY OF THE INVENTION

Accordingly, the present invention in one aspect provides a toaster comprising a housing at-least one toasting chamber enclosed within the housing, each chamber having an opening towards top of the housing and a carriage within the housing for receiving a bread product, a heating assembly provided within the toasting chamber, the heating assembly comprising a plurality of spaced apart heating elements, and at least one heating zone for trapping hot air inside the toasting chamber, the heating zone reduces rate at which hot air moves out of the toaster maintaining a minimum temperature gradient within the toasting chamber, thereby uniformly toasting the bread product.

In one another aspect, the present invention provides a heating assembly for toasters comprising a plurality of spaced apart heating elements disposed within toasting chambers, and at-least one heating zone comprising at-least one baffle provided on top of at-least one heating element, the baffles trapping the hot air and reducing the rate at which hot air moves up maintaining a minimum temperature gradient along the heating zone, and thereby the heating assembly.

BRIEF DESCRIPTION OF DRAWINGS

Reference will be made to embodiments of the invention, examples of which may be illustrated in the accompanying Figures. These Figures are intended to be illustrative, not limiting. Although the invention is generally described in the context of these embodiments, it should be understood that it is not intended to limit the scope of the invention to these particular embodiments.

FIG. 1 shows a toaster in accordance with an embodiment of the invention, where

FIG. 1A shows a cut-away side view of the toaster and associated heating assembly of the toaster; and FIG. 1B shows a cut-away front view of the toaster and associated vertical baffles of the toaster;

DETAILED DESCRIPTION OF THE INVENTION

Various embodiments of the present invention provide an energy efficient toaster capable of uniformly toasting bread products.

Accordingly, the present invention in general provides a toaster comprising a housing; at-least one toasting chamber enclosed within the housing, each chamber having an opening towards top of the housing and a carriage within the housing for receiving a bread product, a plurality of spaced apart heating elements, and at least one heating zone for trapping hot air inside the toasting chamber, the heating zone reduces rate at which hot air moves out of the toaster maintaining a minimum temperature gradient within the toasting chamber, thereby uniformly toasting the bread product.

FIG. 1 through FIG. 4 shows a toaster 100 and associated assemblies of the toaster 100 in accordance with an embodiment of the invention.

Figure 2:
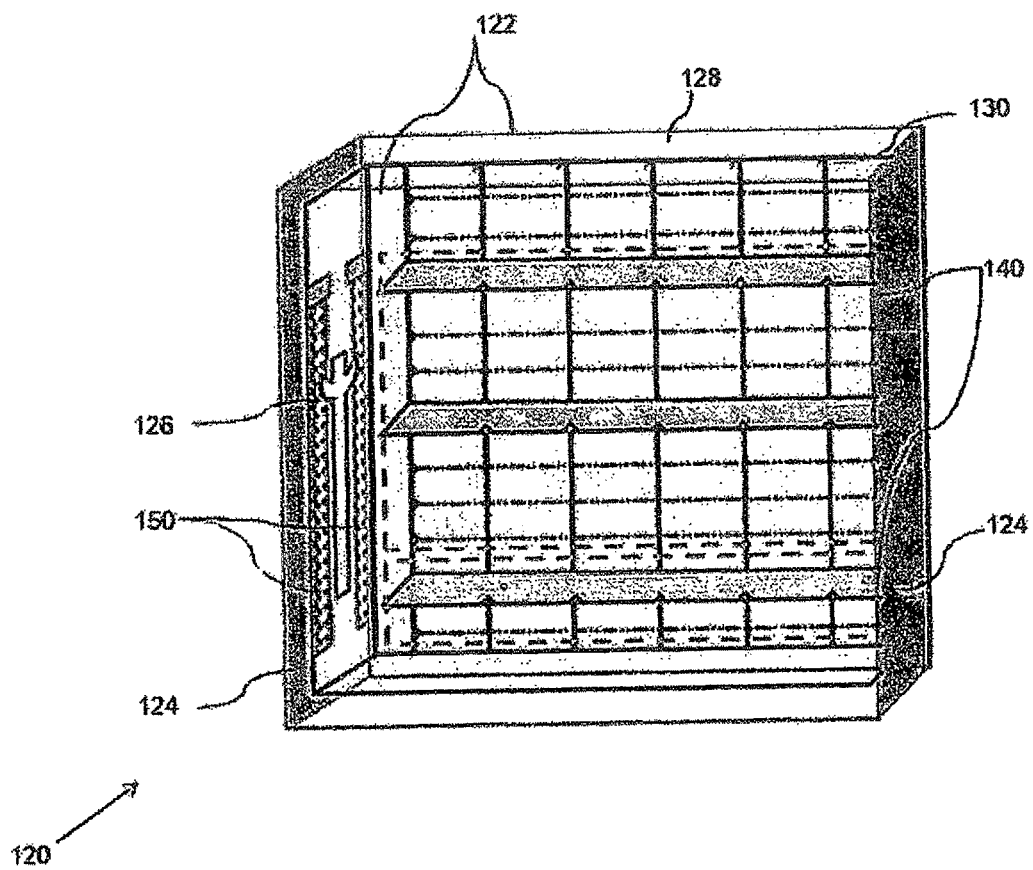
FIG. 2 shows a toasting chamber of the toaster in accordance with an embodiment of the invention.
Figure 3:
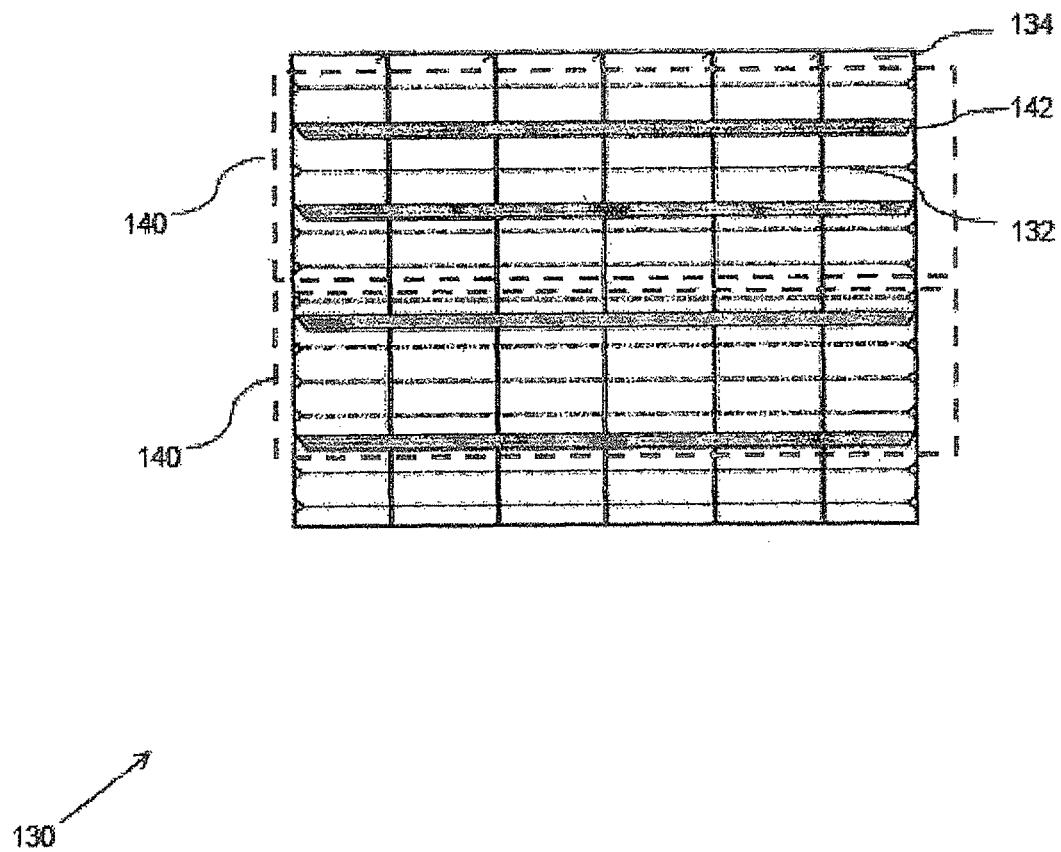
FIG. 3 shows the heating assembly of the toaster in accordance with an embodiment of the invention.

The toaster 100 includes a housing 110 (as shown in FIG. 1), a toasting chamber 120 (as shown in FIG. 2), and a heating assembly 130 (as shown in FIG. 3).

The housing 110 as shown in FIG. 1 has a pair of vertical side walls 112, a pair of vertical end walls 114, a top surface 116a and bottom surface 116b. The top surface 116a is provided with one or more opening 118, each opening 118 for accommodating a bread product such as a slice of bread for making toast. The bottom surface 116b accommodates a removable crumb tray (not shown).

The toasting chambers 120 are disposed in the openings 118 of the housing 110 and enclosed within the housing 110. FIG. 2 shows toasting chamber 120 in greater detail. Each toasting chamber 120 has a pair of vertical side walls 122, and a pair of vertical end walls 124. The toasting chamber includes a slot 126 on each end wall 124 of the chamber for accommodating a carriage (not shown), and has an opening 128 towards top of the housing. The opening 128 of the chamber is in line with the opening 118 of the housing 110 for receiving a slice of bread. The carriage is configured to move up and down within the toasting chamber 120 for raising and lowering the bread product. In this regard the carriage moves up and down along the slot 126 provided in each end wall 124 of the toasting chamber 120. The toasting chambers and the carriage is not limited to a particular size and shape, and can vary depending upon application of the toaster.

According to the present invention, the heating assembly 130 is disposed on both sides of the toasting chamber 120 i.e. on vertical side walls 122 of the toasting chamber 120 such that the bread product is exposed from both sides to the heat/radiation heat given off by the heating assembly 130.

In an embodiment of the invention, the heating assembly 130 includes at-least one heating element 132 and at-least one heating zone 140.

As shown in FIG. 3 the heating elements 132 are provided in a spaced apart relationship. The heating elements are provided on an insulating material sheet 134 such as mica. The heating element is made of a high electric resistivity material such as nichrome. The heating elements 132 are connected to a control circuit (not shown) for energizing and de-energizing the heating elements 132 to radiate heat.

In an embodiment, the heating zone 140 is provided for trapping hot air inside the toasting chamber 120. Advantageously, the heating zone 140 reduces rate at which hot air moves out of the toasting chamber 120 maintaining a minimum temperature gradient within the toasting chamber 120, thereby uniformly toasting the bread product.

The heating zone 140 as shown in the FIGS. 2 and 3 includes plurality of horizontal baffles 142 provided on top of at-least one heating element 130. The horizontal baffles 142 are positioned on a baffle frame or by any other suitable means. The horizontal baffles 142 extend longitudinally within the toasting chamber 120. The baffle frame is positioned adjacent to the insulating sheet frame 134, preferably in front of the insulating sheet frame 134 on which the heating elements 132 are mounted.

The horizontal baffles 142 as shown in the Figures are thus disposed adjacent to the heating elements 132 so as to cover at-least one heating element 132 from the top or the bottom forming the heating zone 140. Thus the arrangement of heating elements 132 and horizontal baffles 142 create multiple heating zones 140. The heating zones 140 perform two primary functions: They reduce the flow rate at which air at ambient temperature enters the toasting chamber 120, and also create an obstacle to the hot air within the heating zone 140 thereby trapping the hot air and reducing the rate at which the hot air moves up and out of the toaster 100. The hot air as it moves from one heating zone 140 to the next heating zone 140, each heating zone 140 retains hot air as the hot air is trapped within the zones exposing the bread product continuously and essentially uniformly to the hot air given off by the heating elements 132. According to the present invention, width of the horizontal baffle extends from heating element 132 towards the bread product to be toasted in such a way that the horizontal baffle 142 does not touch heating element 132 as well as bread product. According to the present invention, the horizontal baffle 142 is not limited to a particular size and shape, and can vary depending upon application of the toaster 100.

According to the present invention, the heating zones 140 as shown in the FIGS. 2 and 3 comprises of at-least two baffles 142—one at top to prevent heat loss and one at the base to reduce the effect of ambient air entering the chamber when heat starts to move up of the toasting chamber 120.

Further, though the figures shows multiple heating zones 140 i.e. multiple horizontal baffles 142, the present invention in an embodiment provides a single heating zone by providing only one horizontal baffle adjacent to the heating element at the top of the toasting chamber.

In an embodiment of the invention, the heating zone 140 comprises at-least one baffle 142 provided on top of at-least one heating element 130, at-least a longitudinal portion of the baffle 142 is configured to move between a first position and a second position. In this regard, in the first position the baffle 142 is perpendicular with respect to the heating elements 132 and/or bread product and will trap the hot air, and in the second position the baffles 142 or at-least a longitudinal portion of the baffle 142 is angularly positioned with respect to the heating elements 132 and/or bread product allowing the hot air to change levels i.e. the heat transfers from one heating zone 140 to the next heating zone 140 maintaining a minimum temperature gradient within the toasting chamber 120, thereby evenly toasting the bread product.

The horizontal baffles 142 move between the first position and the second position depending upon a predetermined temperature and/or a predetermined time. Advantageously the horizontal baffles 142 trap the hot air for a predetermined period or till a predetermined temperature when the horizontal baffle 142 is in the first position and also allows hot air to change levels once the baffle moves from the first position to the second position which evenly toasts the bread without leaving any white lines on the toasted bread which otherwise could form. Advantageously, the horizontal baffles 142 enables the bread product to toast evenly through the lower heating zone to the upper heating zone.

In an embodiment, at-least a portion of the horizontal baffle 142 is a bimetallic plate which changes its orientation depending upon a predetermined temperature.

In another embodiment, the horizontal baffle 142 is a metallic plate mechanically triggered to move from the first position to the second position.

In an embodiment of the invention, as shown in FIGS. 1B and 2 the toaster 100 further comprises of vertical baffles 150 provided on vertical end walls 124 of the toasting chamber 120. According to the present invention, the vertical baffles 150 are provided on both sides of the slot 126 in which the carriage moves within the chamber 120. The vertical baffles 150 are positioned such that the vertical baffles 150 do not obstruct the entry of the bread product in to the toasting chamber.

Figure 4:
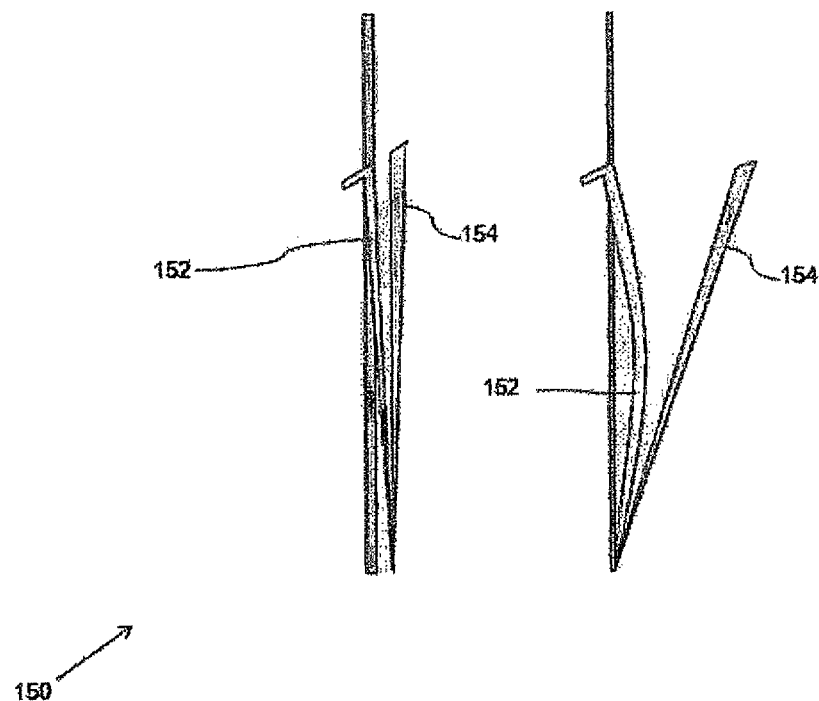
FIG. 4 shows a vertical baffle in accordance with an embodiment of the invention.

FIG. 4 shows the vertical baffle 150 in greater detail. The vertical baffle 150 comprises of a bimetallic plate 152 and a metal plate 154. Each plate 152, 154 extends from an upper end to a lower end. The bimetallic plate 152 and metal plate 154 are connected to each other at the lower end such that when the bimetallic plate 152 bends, the metal plate 154 is pushed outwards as shown in FIG. 4. According to the present invention, the bimetallic plate 152 bends on reaching a pre-determined temperature, and pushes the metal plate 154 towards the bread product covering the bread product along its edges. In this regard, the bimetallic plate 152 bends near its centre pushing the metal plate 154 such that the metal plate 154 is parallel along edges of the bread product. The vertical baffle 150 creates a barrier within the toasting chamber 120 preventing ambient air from reaching to the bread product. Advantageously, the vertical baffle 150 reduces the volume of ambient air from reaching the bread product and toasts the bread product more evenly along edges of the bread product.

In an embodiment the present invention provides a heating assembly for toasters comprising a plurality of spaced apart heating elements disposed within toasting chambers; and at-least one heating zone comprising at-least one baffle provided on top of at-least one heating element, the baffles trapping the hot air and reducing the rate at which hot air moves up maintaining a minimum temperature gradient along the heating zone, and thereby the heating assembly.

According to the present invention, the difference in temperature of the toaster of the present invention between its upper part and lower part is reduced substantially (in the range of 30° C. to 120° C.) resulting in a uniformly toasted bread product. Also the reduced temperature range reduces the power consumption of the toaster.

Advantageously, the toaster of the present invention toasts the bread product faster with even browning on all sides because of lesser temperature differential between upper and lower part of the toasting chamber, reduces toasting time because of lesser heat loss, and also consumes less power.

The foregoing description of the invention has been set merely to illustrate the invention and is not intended to be limiting. Since modifications of the disclosed embodiments incorporating the substance of the invention may occur to person skilled in the art, the invention should be construed to include everything within the scope of the disclosure.

The invention claimed is:

1. A toaster comprising:
 a housing;
 at-least one toasting chamber enclosed within the housing, each chamber having an opening towards top of the housing, and a carriage within the housing for receiving a bread product;
 a plurality of spaced apart heating elements; and
 at least one heating zone provided in each toasting chamber for trapping hot air inside each heating zone, each heating zone comprises a horizontal baffle provided on top of the heating zone extending longitudinally over at least one said heating element and transversely from the heating element towards a bread product to be toasted within the toasting chamber, said horizontal baffle is configured to move between a first position and a second position, wherein the horizontal baffle traps the hot air at first position in the heating zone, and allows the hot air to move from one heating zone to the next heating zone at the second position depending upon pre-determined temperature or predetermined time, thereby reducing rate at which hot air moves out of the toaster, maintaining a minimum temperature gradient within the toasting chamber, thereby uniformly toasting the bread product.

2. The toaster as claimed in claim 1, wherein the horizontal baffles are mounted on a baffle frame provided between the carriage and a heating element frame.

3. The toaster as claimed in claim 1, wherein the horizontal baffle is a metallic plate or a bimetallic plate.

4. The toaster as claimed in claim 1, further comprised of vertical baffles provided on end walls for creating a barrier within the toasting chamber preventing ambient air from reaching the bread product.

5. The toaster as claimed in claim 1, wherein the vertical baffles include a bimetallic plate and a metal plate, each plate extending from an upper end to a lower end, wherein the bimetallic plate and metal plate are connected to each other at the lower end such that when the bimetallic plate bends, the metal plate is pushed towards the bread product.

6. A toaster comprising:
 a housing;
 at-least one toasting chamber enclosed within the housing, each chamber having an opening towards top of the housing, and a carriage within the housing for receiving a bread product;
 a plurality of spaced apart heating elements; and
 a plurality of heating zone provided in each toasting chamber for trapping hot air inside each heating zone, each heating zone comprises a horizontal baffle provided on top of the heating zone extending longitudinally over at least one said heating element and transversely from the heating element towards a bread product to be toasted within the toasting chamber, wherein the horizontal baffle traps the hot air inside the heating zone for reducing rate at which hot air moves out of the toaster for maintaining a minimum temperature gradient within the toasting chamber, thereby uniformly toasting the bread product.

* * * * *